United States Patent

De Sipio et al.

[15] 3,636,329

[45] Jan. 18, 1972

[54] FIVE-BIT BINARY TO DECIMAL TRANSLATOR

[72] Inventors: Richard G. De Sipio, Warminster; Patrick J. Finnegan, Philadelphia, both of Pa.

[73] Assignee: The United States of America as represented by the Secretary of the Navy

[22] Filed: Apr. 28, 1970

[21] Appl. No.: 32,673

[52] U.S. Cl. ........................235/155, 340/347 DD, 340/336

[51] Int. Cl. ........................................................H03k 13/24

[58] Field of Search............................235/155, 164; 340/347

[56] References Cited

UNITED STATES PATENTS

| | | | |
|---|---|---|---|
| 3,242,323 | 3/1966 | Marasco | 340/347 X |
| 3,400,388 | 9/1968 | Blank | 340/347 X |
| 3,526,759 | 9/1970 | Clapper | 340/347 X |
| 3,449,555 | 6/1969 | Wang | 235/155 |
| 2,860,327 | 11/1958 | Campbell | 340/347 |
| 3,535,498 | 10/1970 | Smith, Jr. | 235/164 |
| 3,535,500 | 10/1970 | Hu | 235/155 |

*Primary Examiner*—Maynard R. Wilbur
*Assistant Examiner*—Charles D. Miller
*Attorney*—R. S. Sciascia and Henry Hansen

[57] ABSTRACT

A five-bit binary word is displayed as an alpha-numeric tens digit and an alpha-numeric units digit on adjacent seven-segment display tubes. The five-bit binary word is processed by a tens recognition system in order to obtain the tens digit corresponding to the value of the binary word. The tens digit is then converted to binary form and is displayed as a tens digit and is also subtracted from portions of the original five-bit binary word in order to obtain the value of the units digit in binary form. This value is then displayed as the units segment.

4 Claims, 5 Drawing Figures

INVENTORS
Richard G. DeSipio
Patrick J. Finnegan

BY [signature]
ATTORNEY

INVENTORS
Richard G. DeSipio
Patrick J. Finnegan

BY [signature]
ATTORNEY

FIVE-BIT BINARY TO DECIMAL TRANSLATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to binary systems, and more particularly to a device providing alpha-numeric display upon receipt of a binary signal.

In numerous cases it is desirable to provide a alpha-numeric readout upon receipt of binary inputs. One such display is a seven-segment numeric readout which when utilized will display the numbers 0 through 9. Many manufacturers of microelectronic digital circuitry have solved the problem of providing an output to a single seven-segment display under the nomenclature of BCD (binary coded decimal) to seven-segment coder. These devices are presently on the market and directly decode a four-bit binary word to the appropriate numeric readout. Methods attempting to go beyond a units digit have in the past tended to be complex arrangements requiring a large number of components.

SUMMARY OF THE INVENTION

Accordingly, it is the purpose of the present invention to provide a simplified system for displaying a five-bit binary word (0 through 31) and utilizing a BCD to seven-segment coder in order to display the numeric value on two seven-segment tubes.

This is accomplished by applying a five-bit binary word to a tens recognition circuit and applying the output of the tens recognition system to a binary coding system. The output of the binary coding system is supplied directly to the BCD to seven-segment coder for direct display of the tens digit. The output of the binary coding system is also applied to a subtraction circuit which uses this output as the subtrahend and portions of the original five-bit signal as the minuend. The remainder is then applied to a BCD to seven-segment coder for display of the units digit.

DESCRIPTION OF THE PREFERRED EMBODIMENT

Figure 1:
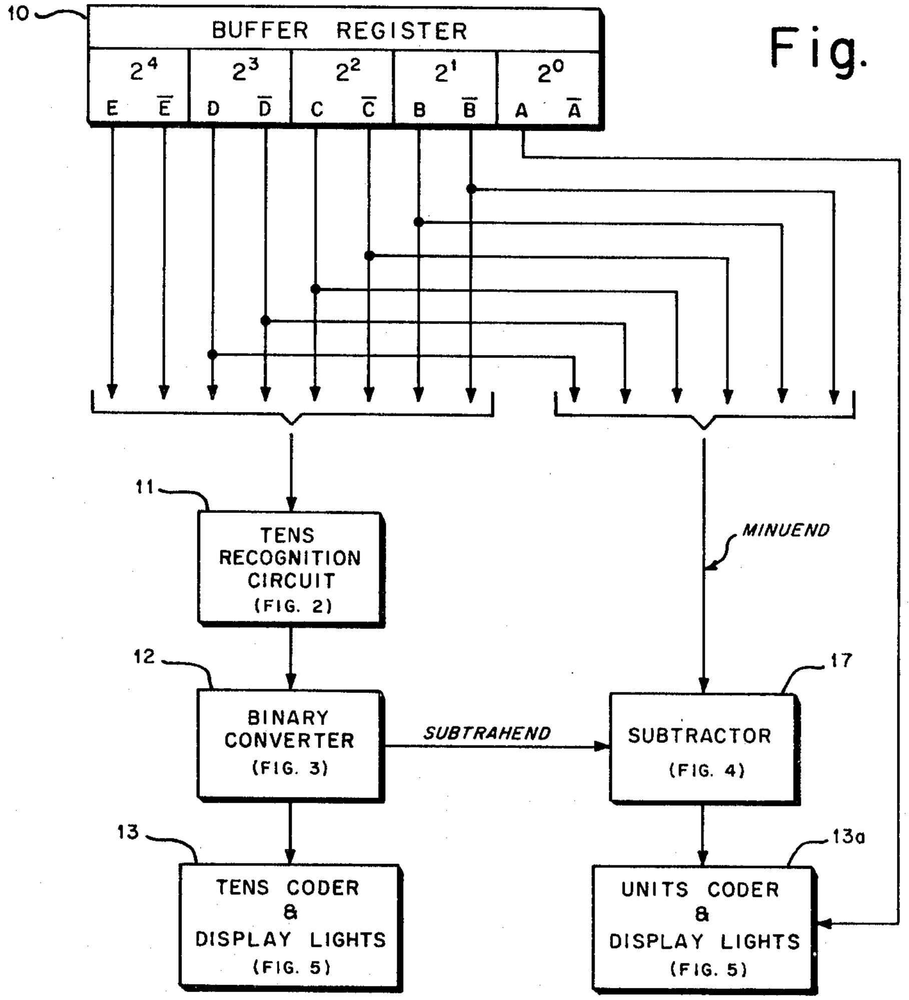
FIG. 1 shows a block diagram of an embodiment of the present invention.

Referring now to FIG. 1 of the drawing, there is shown a buffer register 10 that supplies binary signals to a tens recognition circuit 11. The tens recognition circuit 11 operates on the binary signal and obtains the tens digit associated with the binary number. A signal indicative of the tens digit is then applied to binary converter 12 that converts the applied signal to binary form. One set of outputs from the binary converter 12 is applied directly to the "tens" seven-segment coder and display lights system 13. Another set of output signals from the binary converter 12 is applied to the subtractor 17 where the signals function as the subtrahend within the subtracter circuit 17. Selected output signals from the buffer register 10 are also applied to the subtracter 17 where such signals function as the minuend within the subtracter 17. A units seven-segment coder and display lights system 13*a* identical to system 13 then receives input signals from the subtracter 17 and a signal from the $2^0$ portion of the binary register 10.

The signals E, $\overline{E}$, D, $\overline{D}$, C, $\overline{C}$, B, $\overline{B}$, A and $\overline{A}$ supplied at the output of buffer register 10 are indicative of the binary number within the register 10. If the binary number were 11011, ED$\overline{C}$BA would be the high-level signals.

Figure 2:
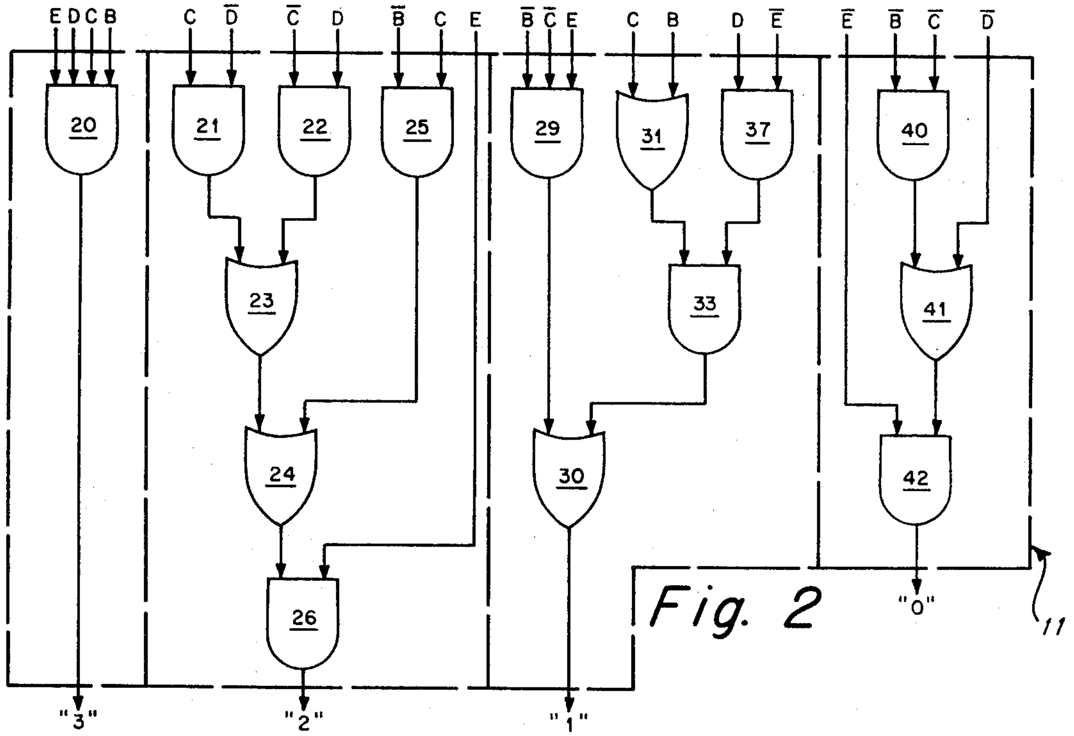
FIG. 2 is a logic diagram of a tens recognition circuit of the embodiment of FIG. 1.

In FIG. 2 an AND-gate 20 receives signals EDCB from the buffer register 10 representative of the $2^4$ binary bit, the $2^3$ binary bit, the $2^2$ binary bit, and the $2^1$ binary bit respectively. If all are high-level signals then a high output is received from the AND-gate 20 representing that a "3" is the tens digit on the received signal. The recognition system for recognizing a "2" as the tens digit comprises an AND-gate 21 receiving signals from C and $\overline{D}$ of register 10 and an AND-gate 22 receiving signals from $\overline{C}$ and D. AND-gates 21 and 22 both have their outputs applied to an OR-gate 23. The output of this OR gate is applied to an OR-gate 24 that has another input from an AND-gate 25 that receives input signals from $\overline{B}$ and C. The output of OR-gate 25 is applied to AND-gate 26 which has a second input from E and the coincidence of high-level signals applied to AND-gate 26 provides an output indicating that a "2" is the tens digit number.

The recognition system for "1" being the tens digit comprises an AND-gate 29 receiving $\overline{B}$, $\overline{C}$ and E input signals with the output being applied to an OR-gate 30. An OR-gate 31 receives a C and a B signal with the output being applied to an AND-gate 33. An AND-gate 37 receives a D and an $\overline{E}$ signal with the output being a second input to AND-gate 33. The AND-gate 33 applies its output signal as a second input to OR-gate 30 and a high-level signal being received from OR-gate 30 indicates the presence of a "1" as the tens digit.

A "0" as the tens digit can be shown by applying the $\overline{B}$ and $\overline{C}$ signals to AND-gate 40 with the output being applied to OR-gate 41 which also receives a $\overline{D}$ signal. The output of OR-gate 41 is applied to AND-gate 42 which also receives an $\overline{E}$ signal. A high-level signal in the output of AND-gate 42 indicates the presence of "0" as the tens digit.

Figure 3:
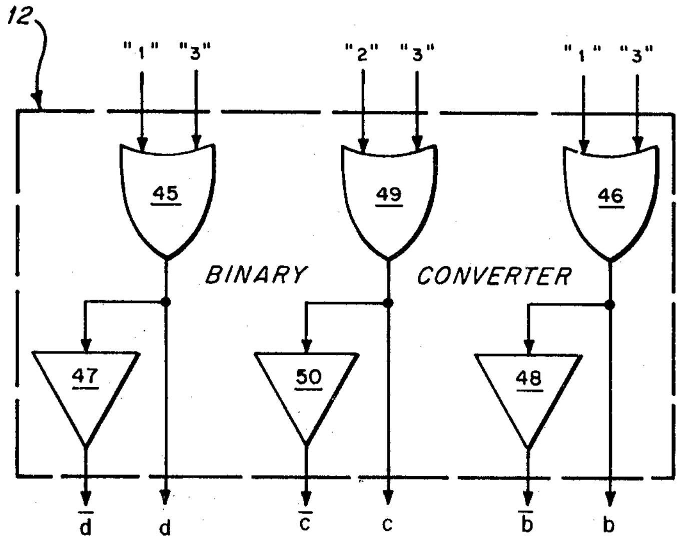
FIG. 3 is a logic diagram of a binary converter of the embodiment of FIG. 1.

FIG. 3 is a binary converter that shows three binary bit outputs denoted as $2^1$, $2^2$ and $2^3$. These binary bits have signals designated as b, $\overline{b}$, c, $\overline{c}$, d and $\overline{d}$. The output signals "1" and "3" from the tens recognition circuit are applied to OR-gates 45 and 46. The output of OR-gate 45 is shown as *d*. This output is also supplied to an inverter 47 whose output is shown as $\overline{d}$. The output of OR-gate 46 is shown as *b* and the output is also applied to an inverter 48 whose output is shown as $\overline{b}$. The output signals "2" and "3" from the tens recognition circuit are applied to OR-gate 49 whose output is shown as *c* and the output is also applied to an inverter 50 whose output is shown as $\overline{c}$.

Figure 4:
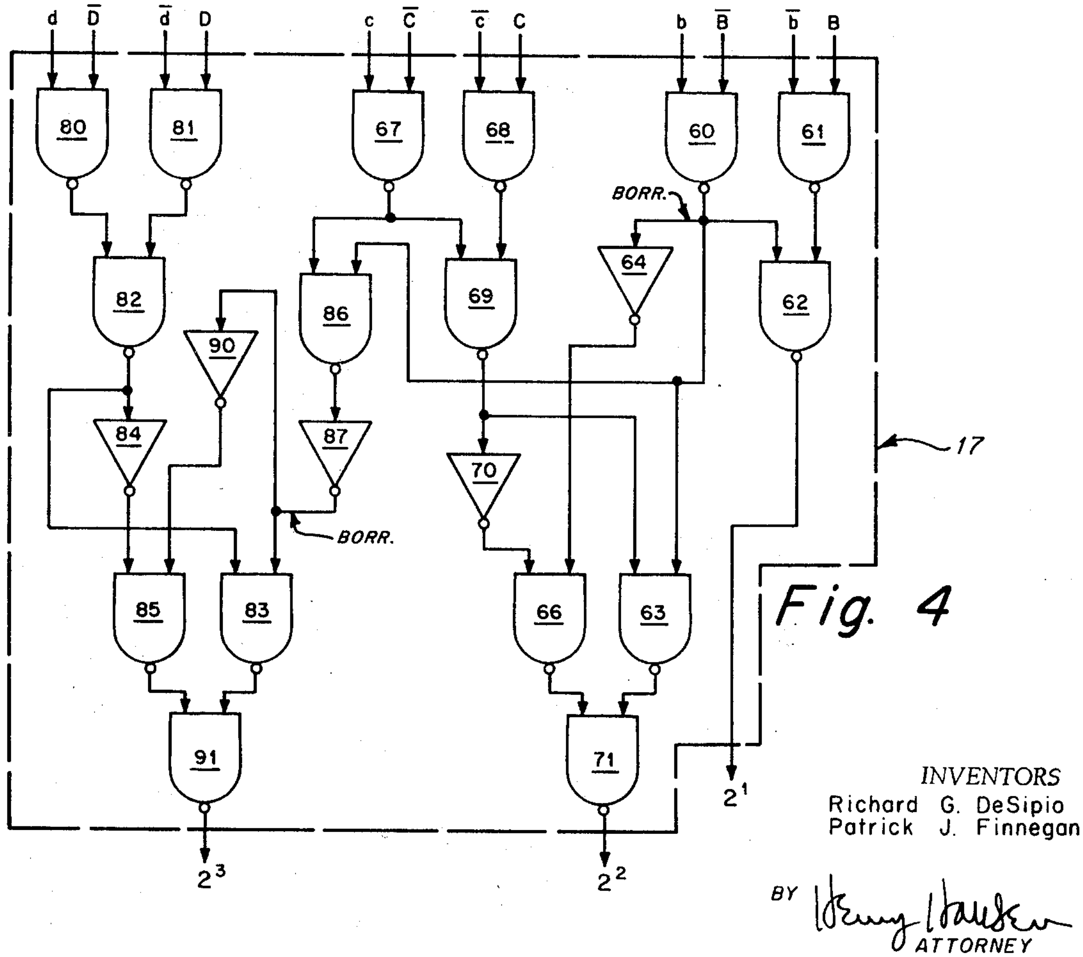
FIG. 4 is a logic diagram of a subtracter of the embodiment of FIG. 1.

The subtracter 17 as shown in FIG. 4 receives as signals from the $2^3$, $2^2$ and $2^1$ portions of the buffer register denoted as D, $\overline{D}$, C, $\overline{C}$, B and $\overline{B}$ and also signals from the binary converter 12 denoted as *d*, $\overline{d}$, *c*, $\overline{c}$, *b* and $\overline{b}$. The signals from the register 10 are utilized as the minuend and the signals from the binary converter 12 supply the subtrahend for the subtracter 17.

$\overline{B}$ and *b* are applied to NAND-gate 60. B and $\overline{b}$ are applied to NAND-gate 61. The outputs of NAND-gates 60 and 61 are applied to NAND-gate 62 whose output is the $2^1$ input to coder 13*a*. The output of NAND-gate 60 is also applied to NAND-gate 63 and inverter 64. The output of inverter 64 is applied to NAND-gate 66. The *c* and $\overline{C}$ signals are applied to NAND-gate 67. The $\overline{c}$ and C signals are applied to NAND-gate 68. The outputs of NAND-gates 67 and 68 are applied to NAND-gate 69. The output of NAND-gate 69 is applied to NAND-gate 63 and to inverter 70. The output of inverter 70 is applied to NAND-gate 66. The outputs of NAND-gates 63 and 66 are applied to NAND-gate 71 whose output is applied to the coder 13*a* as the $2^2$ signal.

The *d* and $\overline{D}$ signals are applied to NAND-gate 80 and the $\overline{d}$ and D signals are applied to NAND-gate 81. The outputs of NAND-gates 80 and 81 are applied to NAND-gate 82. The output of NAND-gate 82 is applied to NAND-gate 83 and to inverter 84. The output of inverter 84 is applied to NAND-gate 85. NAND-gate 86 receives an output signal from NAND-gates 60 and 67. The output of NAND-gate 86 is applied to inverter 87 and the output of inverter 87 is applied to both NAND-gate 83 and inverter 90. The output of inverter 90 is applied to NAND-gate 85. The outputs of NAND-gates 83 and 84 are applied to NAND-gate 91 whose output is the $2^3$ input to the coder 13*a*. The coder 13*a* receives its $2^0$ signal from buffer register 10 and, as explained, its $2^1$, $2^2$ and $2^3$ signal from the three-bit subtracter 17 and by means well known in the art then displays the units digit.

Figure 5:
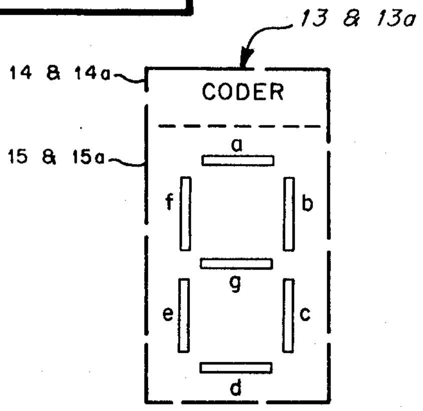
FIG. 5 is a block diagram and pictorial representation of a coder and display lights component of the embodiment of FIG. 1.

The operation of the device will now be explained. It is well known in the art to convert digital binary information into the appropriate seven-segment, *a* through g, form, for illumination as a numeric readout. Several decoding elements are now commercially available such as Model PL 900 manufactured by Pinlites Incorporated which receive a four-bit binary word and convert this to a visual seven-segment light display. FIG. 5 shows the seven-segment arrangement which is a part of the seven-segment coder and display lights 13 and 13*a*. Table I governs the illumination of the various light segments and table II shows a typical logic truth table for determining the digit to be illuminated.

TABLE I

| Light Segment | Decimal Number | | | | | | | | | |
|---|---|---|---|---|---|---|---|---|---|---|
| | 0 | 1 | 2 | 3 | 4 | 5 | 6 | 7 | 8 | 9 |
| *a* | X | | X | X | | X | | X | X | X |
| *b* | X | X | X | X | X | | | X | X | X |
| *c* | X | X | | X | X | X | X | X | X | X |
| *d* | X | | X | X | | X | X | | X | |
| *e* | X | | X | | | | X | | X | |
| *f* | X | | | | X | X | X | | X | X |
| *g* | | | X | X | X | X | X | | X | X |

TABLE II

| Binary Inputs | | | | Numeric Readout |
|---|---|---|---|---|
| $2^3$ | $2^2$ | $2^1$ | $2^0$ | |
| 8 | 4 | 2 | 1 | |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |

Tables I and II outline an existing method which will decode and display a seven-segment numeric readout for numbers 0 through 9 only. This invention carries the process further and shows a display up to and including 31. This means a five-bit binary word instead of the former four-bit word must be processed. In addition, the readout requires two digits in place of the one digit in the system of table II. The following table III is a typical logic truth table for a five-bit binary word with the numeric display that must be obtained for each input. In the table the letter E represents the $2^4$ bit, D represents the $2^3$ bit, C represents the $2^2$ bit, B the $2^1$ bit and A the $2^0$ bit.

TABLE III

| Binary Inputs | | | | | Numeric Display |
|---|---|---|---|---|---|
| E | D | C | B | A | |
| 0 | 0 | 0 | 0 | 0 | 0 |
| 0 | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| 0 | 0 | 1 | 1 | 0 | 6 |
| 0 | 0 | 1 | 1 | 1 | 7 |
| 0 | 1 | 0 | 0 | 0 | 8 |
| 0 | 1 | 0 | 0 | 1 | 9 |
| 0 | 1 | 0 | 1 | 0 | 10 |
| 0 | 1 | 0 | 1 | 1 | 11 |
| 0 | 1 | 1 | 0 | 0 | 12 |
| 0 | 1 | 1 | 0 | 1 | 13 |
| 0 | 1 | 1 | 1 | 0 | 14 |
| 0 | 1 | 1 | 1 | 1 | 15 |
| 1 | 0 | 0 | 0 | 0 | 16 |
| 1 | 0 | 0 | 0 | 1 | 17 |
| 1 | 0 | 0 | 1 | 0 | 18 |
| 1 | 0 | 0 | 1 | 1 | 19 |
| 1 | 0 | 1 | 0 | 0 | 20 |
| 1 | 0 | 1 | 0 | 1 | 21 |
| 1 | 0 | 1 | 1 | 0 | 22 |
| 1 | 0 | 1 | 1 | 1 | 23 |
| 1 | 1 | 0 | 0 | 0 | 24 |
| 1 | 1 | 0 | 0 | 1 | 25 |
| 1 | 1 | 0 | 1 | 0 | 26 |
| 1 | 1 | 0 | 1 | 1 | 27 |
| 1 | 1 | 1 | 0 | 0 | 28 |
| 1 | 1 | 1 | 0 | 1 | 29 |
| 1 | 1 | 1 | 1 | 0 | 30 |
| 1 | 1 | 1 | 1 | 1 | 31 |

It is to be noted from table III that only numbers 30 and 31 contain a "1" or high level at B, C, D and E. It is possible to group other sets of numbers such as 16, 17, 18 and 19. It will be noted that these four numbers contain a "0" or low level at C, D and E. It is to be further noted that they are the only five-bit numbers that do contain these elements. Table IV shows a uniqueness of certain numbers when coded as binary bits in deriving a system for identification of the tens digit in a five binary bit word.

TABLE IV

| Binary Input | Numeric Representation | Tens Digit | Equation |
|---|---|---|---|
| B C D E | 30-31 | 3 | BCDE |
| $C\overline{D}E$ | 20-21-22-23 | 2 | $C\overline{D}E+\overline{C}DE+\overline{B}CE$ |
| $\overline{C}DE$ | 24-25-26-27 | 2 | $E(C\overline{D}+\overline{C}D+\overline{B}C)$ |
| $\overline{B}CE$ | 28-29 | 2 | $E(C\oplus D)+\overline{B}C$ |
| $\overline{C}\,\overline{D}E$ | 16-17-18-19 | 1 | $\overline{CD}E+CD\overline{E}+BD\overline{E}$ |
| $CD\overline{E}$ | 12-13-14-15 | 1 | $\overline{CD}E+D\overline{E}(C+B)$ |
| $BD\overline{E}$ | 10-11 | 1 | |
| $\overline{B}\,\overline{C}\,\overline{E}$ | 8-9 | 0 | $\overline{BCE}+\overline{ED}$ |
| $\overline{D}E$ | 0-1-2-3-4-5-6-7 | 0 | $\overline{E}(\overline{BC}+\overline{D})$ |

Table IV derives certain equations that show the tens digit. FIG. 2 shows a system for obtaining the tens digits using the equations of table IV. From FIG. 2 it can be seen that if a high-level signal is present at E, D, C and B that high level is obtained at the output of AND-gate 20. This immediately shows that the tens digit of the received binary word is a "3."

Once the tens digits have been obtained the subtraction of the number that such digit represents from the original number leaves a remainder that is the units digit. For example, a "3" is the tens digits representing a number of 30 and the subtraction of 30 from the number 31 represented by a five-bit binary word leaves us with the units digit "1." However, in order to make this subtraction it is first necessary to convert the tens digit into binary information in order to use the number that the tens digit represents as the subtrahend in an subtraction process. The binary converter 12 of FIG. 3 provides this function.

Table V shows a subtraction of 0, 10, 20 and 30 from selected five-bit binary words. It is to be noted that in order to provide identification of the tens digit only the $2^1$, $2^2$, and $2^3$ binary bits are necessary. As far as the $2^0$ bit is concerned, it is to be noted that in 0, 10, 20 and 30 this bit is 0 and, therefore, in no way aids in identification. Since the $2^0$ bit in the subtrahend is always 0, the $2^0$ bit in the register 10 is routed directly to the units seven-segment coder and display lights 13*a*. The $2^4$ bit is of no consequence since the units display is only concerned with the quantities 0 through 9 which require but the first four binary bits.

TABLE V

| | $2^4$ | $2^3$ | $2^2$ | $2^1$ | $2^0$ | |
|---|---|---|---|---|---|---|
| Input five bit word | 1 | 0 | 0 | 1 | 1 | = 19—minuend |
| Ten | 0 | 1 | 0 | 1 | 0 | = 10—subtrahend |
| | | 1 | 0 | 0 | 1 | = 9—remainder |
| Input five bit word | 1 | 1 | 1 | 1 | 1 | = 31 |
| Thirty | 1 | 1 | 1 | 1 | 0 | = 30 |
| | | 0 | 0 | 0 | 1 | = 1 |
| Input five bit word | 1 | 1 | 1 | 0 | 1 | = 29 |
| Twenty 1 | | 0 | 1 | 0 | 0 | = 20 |
| | | 1 | 0 | 0 | 1 | = 9 |
| Input five bit word | 1 | 0 | 0 | 0 | 0 | = 16 |
| Ten | 0 | 1 | 0 | 1 | 0 | = 10 |
| | | 0 | 1 | 10 | | = 6 |
| Input five bit word | 0 | 1 | 0 | 0 | 0 | = 8 |
| Zero | 0 | 0 | 0 | 00 | | = 0 |
| | | 1 | 0 | 0 | 0 | = 8 |

The subtracter 17 as shown in FIG. 4 subtracts the $2^1$, $2^2$ and $2^3$ bit in the binary converter 12 from the respective bits of the generated word in the buffer register.

The remainder in subtracter 17 is then supplied to the units coder 14*a* of the units coder and display light 13*a* as the $2^3$, $2^2$ and $2^1$ bit, respectively. As mentioned previously the $2^0$ bit received by the coder 14*a* is supplied directly from the respective bit of the buffer register 10. This $2^0$ bit can also be routed through subtracter 17 without operating on the bit since the subtrahend in subtracter 17 has no $2^0$ bit. The units seven-segment coder and display lights 13*a* then processes the received bits and displays the appropriate units digit.

The tens digit may be obtained by the processing of the output of FIG. 3. The following table VI shows that 0, 10, 20 and 30 all have different combinations in the $2^2$ and $2^1$ outputs of FIG. 3.

TABLE VI

| | $2^2$ | $2^1$ |
|---|---|---|
| Zero | c | b |
| Ten | $\bar{c}$ | b |
| Twenty | c | $\bar{b}$ |
| Thirty | c | b |

Furthermore if only the *c* and *b* outputs of FIG. 3 were used one would recognize that the number zero is represented by the binary bit 0 0, the number 10 by the binary bit 0 1, the number 20 by the binary bit 1 0, and the number 30 by the binary bit 1 1. Therefore, the outputs *c* and *b* from the binary converter 12 can be applied directly to the respective $2^1$ bit input and $2^0$ bit input of coder 14 and the correct tens digit readout will be obtained from display lights 15.

The operation of the device will now be described using the number 27 as the binary coded signal generated by the buffer register 10. The binary representation for 27 is 1 1 0 1 1. Therefore, the high-level signals generated by the buffer register would be E, D, $\overline{C}$, B and A. The A signal would provide an input to the units seven-segment coder and display lights 13 directly and not be processed any further. The E, D, $\overline{C}$ and B high-level signals would provide inputs to the tens recognition circuit 11. A high-level output is obtained at "2" and at no other output in recognition circuit 11. This high-level output is obtained through gates 22, 23, 24 and 26 within the "2" portion of the circuit 11.

This output is then supplied to binary converter 12 and it can be seen from FIG. 3 that high-level signals will appear at $\bar{d}$, *c* and $\bar{b}$.

The output *c*, *b* from converter 12 would be the binary word 1 0 and this would then be applied directly to the tens seven-segment coder and display lights 13 and the digit 2 would be displayed. The output of binary converter 12 is then applied to subtracter 17 to be subtracted from the $2^1$, $2^2$, and $2^3$ portions of the buffer register 10 which is also supplied to the subtracter 17. The operation of subtracter 17 as shown in FIG. 4 is as follows: NAND-gate 80 has two low-level inputs, NAND-gate 81 has two high-level inputs, NAND-gate 67 has two high-level inputs, NAND-gate 68 has two low-level inputs, NAND-gate 60 has two low-level inputs, and NAND-gate 61 has two high-level inputs. From this it can be seen that high-level outputs are obtained at the outputs of gates 60, 62, 68, 69, 66, 86, 80, 82, 90, 85, and 83. Therefore, the $2^3$ level portion of the circuit would have low-level output, the $2^2$ portion of the circuit would have a high-level output, and the $2^1$ portion of the circuit would have a high-level output.

This output is applied directly to the units seven-segment coder and display lights 13*a*. It can, therefore, be seen that the binary input level to this portion of the circuit is 0 1 1 1, the final digit being supplied directly by the buffer register 10. This binary number is representative of the digit 7 and such digit will be displayed by the units coder and display lights 13*a*.

It is, therefore, seen that this system displays the number 27 supplied as a binary word from the buffer register 10 as an output display in digit form by components 13 and 13*a*.

A simplified system has thus been shown that is capable of receiving a five-bit binary signal and performing operations on selected groups of numbers represented by the five-bit signal to obtain the tens digit. The subtraction of the tens digit from the original binary signal then yields the units digit.

Obviously many modifications and variations of the present invention are possible in the light of the above teachings. It is therefore to be understood that within the scope of the appended claims the invention may be practiced otherwise than as specifically described.

What is claimed is:

1. A translator for displaying a two-digit number represented by a first binary-coded signal having $2^4$, $2^3$, $2^2$, $2^1$ and $2^0$ bits comprising:
   - recognition means adapted to receive the $2^4$, $2^3$, $2^2$ and $2^1$ bits for generating a first output signal representative of the tens digit of the number;
   - converter means connected to receive said first output signal and for generating a second output signal and a second binary-coded signal each representative of the tens digit of the number;
   - first display means connected to receive said second binary-coded signal for displaying in alpha-numeric form the tens digit of the number;
   - subtracter means connected to receive said second output signal and the $2^3$, $2^2$ and $2^1$ bits for generating a third binary-coded signal; and
   - second display means connected to receive said third binary-coded signal and the $2^0$ bit for displaying in alpha-numeric form the units digit of the number.

2. A translator according to claim 1 further comprising:
   - said first circuit means including first logic means for providing a "1" output when the $2^3$ bit is "1" and the $2^4$ bit is "0," second logic means for providing a "1" output when either of the $2^1$ and $2^2$ bits are "1," third logic means for providing a "1" output on receipt of "1" outputs from both said first and second logic means, fourth logic means for providing a "1" output signal when the $2^3$ and $2^2$ bits are "0" and the $2^4$ bit is "1," fifth logic means for providing an output signal indicative of a tens digit of one when either of said third and fourth logic means outputs is "1."

3. A translator according to claim 2 further comprising:
   - said second circuit means including sixth logic means for providing a "1" output signal when the $2^1$ bit is "0" and the $2^2$ bit is "1," seventh logic means for providing a "1" output signal when the $2^2$ bit is "0" and the $2^3$ bit is "1," eighth logic means for providing a "1" output signal when the $2^2$ bit is "1" and the $2^3$ bit is "0," ninth logic means for providing a "1" output signal upon either of said seventh and eighth logic means outputs being "1," tenth logic means connected for providing a "1" output signal upon any of said sixth and ninth logic means outputs being "1," eleventh logic means for providing a "1" output signal indicative that said first binary-coded signal represents one of the numbers 20–29, inclusive, when the $2^4$ bit is "1"

and the tenth logic means provides a "1" output signal.

4. A translator according to claim 3 further comprising: said third circuit means including twelfth logic means for providing a "1" output signal indicative that said binary-coded signal represents one of the numbers 30 and 31 when the $2^1$, $2^2$, $2^3$ and $2^4$ bits are "1."

* * * * *